United States Patent
McRobbie et al.

(10) Patent No.: US 11,753,583 B2
(45) Date of Patent: *Sep. 12, 2023

(54) TREATMENT OF SUBTERRANEAN FORMATIONS

(71) Applicant: INNOSPEC LIMITED, Ellesmere Port (GB)

(72) Inventors: Ian Malcolm McRobbie, Ellesmere Port (GB); William Trenholme, Ellesmere Port (GB)

(73) Assignee: INNOSPEC LIMITED, Ellesmere Port (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/429,807

(22) PCT Filed: Feb. 11, 2020

(86) PCT No.: PCT/GB2020/050315
§ 371 (c)(1),
(2) Date: Aug. 10, 2021

(87) PCT Pub. No.: WO2020/165577
PCT Pub. Date: Aug. 20, 2020

(65) Prior Publication Data
US 2022/0127522 A1  Apr. 28, 2022

(30) Foreign Application Priority Data
Feb. 12, 2019  (GB) ..................... 1901930

(51) Int. Cl.
*C09K 8/62* (2006.01)
*C09K 8/66* (2006.01)
(Continued)

(52) U.S. Cl.
CPC .............. *C09K 8/665* (2013.01); *C06B 29/00* (2013.01); *C06B 31/00* (2013.01); *C09K 8/703* (2013.01); *E21B 43/2605* (2020.05); *E21B 43/27* (2020.05)

(58) Field of Classification Search
CPC .......... C09K 8/592; C09K 8/665; C09K 8/70; C09K 8/72; C09K 8/66; C09K 8/62;
(Continued)

(56) References Cited

U.S. PATENT DOCUMENTS 3,288,658 A * 11/1966 Ferguson ................ C06B 47/14 86/20.12
3,449,181 A * 6/1969 Armantrout ............ C06B 47/14 149/43

(Continued)

FOREIGN PATENT DOCUMENTS

CA  2689187 A1  6/2010
CN  1554725 A   12/2004
(Continued)

OTHER PUBLICATIONS

Pubchem, Compound Summary Sulfamic Acid, retrieved Sep. 20, 22 from National Library of Medicine, https://pubchem.ncbi.nlm.nih.gov/compound/Sulfamic-acid (Year: 2022).*

(Continued)

*Primary Examiner* — Angela M DiTrani Leff
(74) *Attorney, Agent, or Firm* — Shumaker, Loop & Kendrick, LLP (57) ABSTRACT

A method of treating a subterranean formation by contacting the formation with the following: (a) an ammonium compound; (b) an oxidizing agent selected from a perchlorate or a nitrite or combinations thereof; and (c) one or more acids, at least one of which is a bisulfate salt.

19 Claims, 1 Drawing Sheet

(51) Int. Cl.
  *E21B 43/27* (2006.01)
  *E21B 43/26* (2006.01)
  *C06B 29/00* (2006.01)
  *C06B 31/00* (2006.01)
  *C09K 8/70* (2006.01)

(58) Field of Classification Search
  CPC . C09K 8/60; C09K 8/703; C09K 8/74; C09K 8/84; C09K 8/845; C09K 8/92; E21B 43/26; E21B 43/25; E21B 43/263; E21B 43/27
  See application file for complete search history.

(56) References Cited

U.S. PATENT DOCUMENTS

| | | | |
|---|---|---|---|
| 3,660,182 A * | 5/1972 | Cook | C06B 47/14 149/46 |
| 3,839,107 A | 10/1974 | Clark et al. | |
| 4,055,449 A * | 10/1977 | Wasson | C06B 47/14 149/46 |
| 4,274,893 A * | 6/1981 | Mars | C06B 47/00 149/70 |
| 4,294,633 A | 10/1981 | Clay | |
| 4,294,663 A * | 10/1981 | Tennyson | B01D 47/00 201/39 |
| 4,572,296 A | 2/1986 | Watkins | |
| 4,846,277 A | 7/1989 | Khalil et al. | |
| 2009/0110609 A1 | 4/2009 | Roscioli | |
| 2010/0122815 A1 | 5/2010 | Zamora et al. | |
| 2013/0126169 A1 | 5/2013 | Al-Nakhli et al. | |
| 2014/0144632 A1 | 5/2014 | Zavolzhski et al. | |
| 2015/0175879 A1* | 6/2015 | Al-Nakhli | E21B 36/008 166/300 |
| 2015/0361328 A1* | 12/2015 | Almutairi | E21B 43/24 166/300 |
| 2016/0244659 A1* | 8/2016 | Shahin | E21B 43/16 |
| 2016/0265326 A1* | 9/2016 | Nguyen | E21B 43/267 |
| 2016/0266326 A1 | 9/2016 | Gniadek | |
| 2016/0376884 A1* | 12/2016 | Al-Nakhli | E21B 49/00 166/300 |
| 2017/0081584 A1 | 3/2017 | Shahin et al. | |
| 2018/0209240 A1* | 7/2018 | Gupta | E21B 33/13 |
| 2018/0291720 A1* | 10/2018 | Cairns | C09K 8/54 |

FOREIGN PATENT DOCUMENTS

| | | | |
|---|---|---|---|
| CN | 104931436 A | 9/2015 | |
| CN | 108561111 A | 9/2018 | |
| RU | 2197606 C1 | 1/2003 | |
| RU | 2272897 C1 | 3/2006 | |
| RU | 2373385 C1 | 11/2009 | |
| RU | 2436828 C2 | 12/2011 | |
| WO | 2013/181229 A1 | 12/2013 | |
| WO | 2016065412 A1 | 5/2016 | |
| WO | WO-2016065412 A1 * | 5/2016 | ............. C06B 23/00 |
| WO | 2016/126351 A1 | 8/2016 | |

OTHER PUBLICATIONS

Wikipedia, Ammonium bisulfate, retrieved Sep. 20, 2022 from https://en.wikipedia.org/wiki/Ammonium_bisulfate (Year: 2022).*
International Search Report (ISR) for PCT/GB2020/050309 dated Apr. 9, 2020 (4 pages).
Written Opinion for PCT/GB2020/050309 dated Apr. 9, 2020 (8 pages).
International Search Report (ISR) for PCT/GB2020/050314 dated Apr. 9, 2020 (4 pages).
Written Opinion for PCT/GB2020/050314 dated Apr. 9, 2020 (6 pages).
International Search Report (ISR) for PCT/GB2020/050311 dated Apr. 9, 2020 (4 pages).
Written Opinion for PCT/GB2020/050311 dated Apr. 9, 2020 (8 pages).
International Search Report (ISR) for PCT/GB2020/050315 dated Apr. 9, 2020 (4 pages).
Written Opinion for PCT/GB2020/050315 dated Apr. 9, 2020 (7 pages).
Non-Final Office Action for U.S. Appl. No. 17/429,799, dated Jul. 21, 2022 (38 pages).
Non-Final Office Action for U.S. Appl. No. 17/429,783 dated Sep. 23, 2022 (43 pages).
Final Rejection for U.S. Appl. No. 17/429,799 dated Dec. 1, 2022 (25 pages).
Restriction Requirement for U.S. Appl. No. 17/429,795 dated Mar. 1, 2023 (7 pages).
Final Rejection issued for U.S. Appl. No. 17/429,783 dated Mar. 30, 2023 (37 pages).
Notice of Allowance issued for U.S. Appl. No. 17/429,799 dated Apr. 3, 2023 (15 pages).
Non-Final Office Action issued for U.S. Appl. No. 17/429,795 dated May 8, 2023 (33 pages).

* cited by examiner

TREATMENT OF SUBTERRANEAN FORMATIONS

TECHNICAL FIELD

This invention relates to treatment of subterranean formations, for example to fracture formations and/or stimulate hydrocarbon, for example oil and/or gas, production.

BACKGROUND

Oil and gas reserves trapped within low permeability reservoirs such as shale and tight-gas formations are difficult and expensive to recover using traditional methods. Therefore to maximise the production from such formations, an extensive and complex fracture network must be created. The two most commonly employed methods are hydraulic fracturing and the use of explosives. While hydraulic fracturing does create fractures, the extent and complexity of the fracture patterns may be insufficient to maximise oil recovery and furthermore fracturing fluids are costly and can damage formations. The use of explosives is much more effective at creating multiple radial fractures but also creates large compacted zones of rock from which fluids cannot escape.

A wide range of fracturing methods and formulations has been proposed. However, known methods may be costly and/or use corrosive chemicals. There is, therefore, an ongoing need to develop improved fracturing methods and chemicals.

The present invention is based, in preferred embodiments, on treatment, for example fracturing, of subterranean formations by use of a mixture of chemicals which are arranged to undergo an exothermic reaction and/or produce large quantities of gas underground. The combination of heat and gas pressure can be used to treat, for example fracture, the formation. The combination of heat and gas may create new fractures, extend existing fractures or create microfractures within a hydraulic fracture. In preferred embodiments, the mixture of chemicals generates large gas volumes per mole of reactants in the mixture and releases non-toxic by-products.

It is known to generate heat and gas in downhole operations for use in a secondary fracturing operation. However, known methods produce a limited amount of gas. The pressures experienced within the formation means that a large amount of gas needs to be generated to produce a pressure sufficient to overcome the confining pressure within the wellbore.

Preferred embodiments of the following invention provide a means of increasing the amount of gas that can be rapidly generated by a chemical system, in order to generate a sufficient pressure within the formation to overcome the confining pressure and fracture the formation.

DETAILED DESCRIPTION

It is an object of the present invention to address problems associated with fracturing and/or stimulation of formations.

According to a first aspect of the invention, there is provided a method of treating a subterranean formation, the method comprising contacting the formation with the following:
(a) an ammonium compound;
(b) an oxidizing agent selected from a perchlorate or a nitrite or combinations thereof;
(c) one or more acids, at least one of which is a bisulfate salt.

Advantageously the bisulfate salt, for example ammonium bisulfate, acts as an acid in the reaction and, additionally, its ammonium moiety is able to react to produce nitrogen gas. Thus, the amount of gas produced in the reaction of said ammonium compound, oxidizing agent and bisulfate salt may be increased in comparison to similar reactions involving an acid other than one which may itself produce a gas on reaction.

Said ammonium compound is preferably selected to react with oxidizing agent and/or said bisulfate salt to generate a gas. Said ammonium compound is preferably arranged to generate nitrogen gas on reaction as aforesaid. Said ammonium compound suitably includes a $NH_4^+$ moiety and the nitrogen atom thereof is incorporated into nitrogen gas produced on its reaction. For example the ammonium compound may be the ammonia salt of a metal, a metal complex, an inorganic acid, or an organic acid.

The ammonium compound may be selected from: ammonium fluoride, ammonium chloride, ammonium bromide, ammonium iodide, ammonium nitrate, ammonium sulfate, ammonium hydrogensulfate, ammonium carbonate, ammonium carbamate, ammonium bicarbonate, ammonium hydroxide, ammonium acetate, ammonium borates, ammonium chromate, ammonium dichromate, ammonium cyanides, ammonium glutamate, ammonium molybdate, ammonium oxalate, ammonium hydrogenoxalate, ammonium phosphate monobasic, ammonium phosphate dibasic, ammonium thiosulfate; ammonium formate; ammonium sulfamate; ammonium sulfite, ammonium persulfate, ammonium sulfide, ammonium tartrate dibasic, ammonium thiocyanate, ammonium dihydrogen phosphate and ammonium glycinate.

Said ammonium compound is preferably selected from ammonium sulfamate, ammonium hydroxide, ammonium chloride, ammonium carbonate, ammonium bicarbonate, ammonium carbamate and ammonium formate.

Said ammonium compound most preferably includes, in addition to said $NH_4^+$ moiety, a second moiety which is preferably arranged to generate a gas (e.g. carbon dioxide or nitrogen) on reaction with said oxidizing agent and/or said ammonium salt. In this case, said second moiety may comprise a nitrogen atom, for example a moiety NH or $NH_2$; or may comprise a carbon atom, for example a moiety CO or $CO_2$. Said second moiety may comprise $NH_2SO_3$ or $CO_3$ (which may be part of a $HCO_3$ moiety). Said second moiety may comprise a sulfamate, carbonate or bicarbonate moiety. Said ammonium compound comprising a moiety which is preferably arranged to generate a gas may be selected from ammonium sulfamate, ammonium carbonate and ammonium bicarbonate, ammonium carbamate and ammonium formate.

Said method may comprise contacting the formation with one or more ammonium compounds, for example each being as described herein. In a preferred embodiment, the method comprises contacting the formation with only one type of ammonium compound.

Said bisulfate salt is preferably substantially water soluble. It may comprise an ammonium, an alkali metal or alkaline earth metal bisulfate. The bisulfate may be an anhydrous or hydrated salt. The bisulfate may be potassium bisulfate, lithium bisulfate, sodium bisulfate, ammonium bisulfate, calcium bisulfate, magnesium bisulfate or combinations thereof. Preferably, said bisulfate salt is ammonium bisulfate.

Preferably, said oxidizing agent is selected from a perchlorate or a nitrite; and, more preferably, said oxidizing agent comprises a perchlorate or a nitrite, but not both.

A preferred perchlorate is an alkali metal perchlorate with sodium perchlorate being especially preferred.

Preferably, as between a perchlorate and nitrite, a nitrite is preferred. Said nitrite is preferably arranged to provide nitrite ions in aqueous solution.

Said oxidizing agent may include a moiety comprising a nitrogen atom bonded to an oxygen atom. It may include a nitrogen atom bonded to two oxygen atoms. Said oxidizing agent is preferably arranged to provide nitrite ions in aqueous solution. Said oxidizing agent is preferably a nitrite.

Said nitrite may be selected from alkali metal nitrites, alkaline earth metal nitrites, ammonium nitrite or organic nitrites. Said nitrite is preferably selected from lithium nitrite, sodium nitrite, potassium nitrite, calcium nitrite, magnesium nitrite, ammonium nitrite and combinations thereof. Said nitrite is preferably sodium nitrite.

Said ammonium compound, said oxidizing agent (e.g. a nitrite) and said bisulfate salt, for example ammonium bisulfate, are preferably contacted so that they react and gas, for example comprising nitrogen and/or carbon dioxide, is generated in the formation.

A ratio (A) is defined as the number of moles of ammonium compound divided by the number of moles of nitrite contacted with the formation and/or reacted in the formation. There is no minimum or maximum amount of nitrite required for the invention and so ratio (A) may be any value greater than 0. Ratio (A) may be from 0.05 to 2.0, for example 0.1 to 0.8; and preferably ratio (A) is 0.2 to 0.6.

The method suitably comprises contacting the formation with said ammonium compound, oxidizing agent and said bisulfate salt, for example ammonium bisulfate. The aforementioned react to produce a gas, wherein suitably the gas produced includes nitrogen atoms originating in the acid (e.g. the ammonium bisulfate). Thus, the method is preferably a method of treating a subterranean formation to generate gas within the formation. Production of gas may be arranged to fracture the formation in a region adjacent an area where said gas is produced.

Reference herein to a gas is intended to cover products which are gaseous at standard temperature and pressure (STP) (0° C. and 1 atm).

By use of bisulfate salt, for example, ammonium bisulfate as aforesaid, the acid can be reacted to produce gas which can supplement gas produced by reaction of said ammonium compound and said oxidizing agent.

The method may comprise contacting the formation with one or more acids, wherein one of the acids is ammonium bisulfate as described.

A ratio (B) defined as the number of moles of said ammonium compound divided by the total number of moles of acid (e.g. the number of moles of said ammonium bisulfate and any other acid such as sulfamic acid as herein described) contacted with the formation and/or reacted with said ammonium compound and oxidizing agent in the formation may be greater than 0 and 10 or less. Ratio (B) may be below about 2.0 and so the ratio (B) may be between 0 (i.e. a large excess of acid) to 2, for example 0.2 to 1.5, especially 0.4 to 1.1.

The total number of moles of acid may comprise the sum of the number of moles of bisulfate salt, especially ammonium bisulfate, and any other acid contacted with the formation and/or reacted with said ammonium compound and oxidizing agent in the formation. Ammonium bisulfate suitably makes up at least 20 mol %, preferably at least 40 mol %, of the total number of moles of acid contacted with the formation and/or reacted as described. In some embodiments, said ammonium bisulfate may make up greater than 70 mol %, greater than 90 mole % or greater than 95 mol %.

A ratio (C) defined as the number of moles of said ammonium compound divided by the sum of the number of moles of one or more acids (e.g. the number of moles of said ammonium bisulfate) which are arranged to react, for example with other materials contacted with the formation, to produce a gas (e.g. nitrogen) as described may be in the range greater than 0 and may be 10 or less. Ratio (C) may be in the range, 0 to 10, for example, 0.01 to 4, suitably 0.05 to 2, preferably, 0.2 to 1.5, and especially in the range 0.4 to 1.1.

A ratio (H) defined as the number of moles of oxidizing agent divided by the total number of moles of acid (e.g. the number of moles of ammonium bisulfate) contacted with the formation and/or reacted with said ammonium compound and oxidizing agent in the formation may be in the range greater than 0 and may be 10 or less. Ratio (H) may be in the range 0.1-10, preferably 0.5-7.5, more preferably 0.75-5.0 and most preferably from 0.9-3.5.

A ratio (I) defined as the number of moles of oxidizing agent divided by the sum of the number of moles of one or more acids (e.g. the number of moles of ammonium bisulfate) which are arranged to react, for example with other materials contacted with the formation, to produce a gas (e.g. nitrogen) as described may be in the range greater than 0 and may be 10 or less. Ratio (I) may be in the range in the range 0.1-10, preferably 0.5-7.5, more preferably 0.75-5.0 and most preferably from 0.9-3.5.

Thus, preferably, the bisulfate salt, for example, said ammonium bisulfate, does not simply catalyse another reaction, but rather is directly involved in gas generation by donating atoms other than hydrogen (e.g. by donation of nitrogen atoms) to the gas produced.

Said ammonium compound may be provided as a slurry, an emulsion or a solution. Said ammonium compound may be provided in water and the method may comprise selecting an aqueous solution of said ammonium compound. The solution may be of any suitable concentration up to a saturated solution. Said ammonium compound may or may not be encapsulated, for example with an encapsulant arranged to delay reaction with the oxidizing agent (e.g. nitrite) and/or bisulfate salt on contact therewith. Said ammonium compound is preferably not encapsulated.

Said oxidizing agent, for example nitrite, may be provided as a slurry, an emulsion or a solution. Said oxidizing agent, for example nitrite, may be provided in water and the method may comprise selecting an aqueous solution of said oxidizing agent, for example nitrite. The solution may be of any suitable concentration up to a saturated solution. Said oxidizing agent, for example nitrite, may or may not be encapsulated, for example with an encapsulant arranged to delay reaction with the ammonium compound and/or bisulfate salt on contact therewith. Said oxidizing agent, for example nitrite, is preferably not encapsulated.

Said bisulfate salt, for example ammonium bisulfate, may be provided in water for example as a solution in water. Said bisulfate salt, for example ammonium bisulfate, is preferably not encapsulated, for example with an encapsulant arranged to delay reaction with the ammonium compound and/or oxidizing agent on contact therewith.

Said bisulfate salt, for example ammonium bisulfate, may be used in combination with an acid (2) which may be a sulfur-based acid. Acid (2) may include a moiety:

I for example a moiety

Preferably, said acid includes a nitrogen-atom. Said acid may include a $NH_2$ moiety such as found in sulfamic acid.

Said acid (2) is preferably arranged to react, for example with other materials contacted with the formation (e.g. with said ammonium compound and/or said oxidizing agent), to produce a gas, wherein suitably the gas produced includes nitrogen atoms originating in the acid (2).

Said acid (2) is preferably sulfamic acid.

When said bisulfate salt, for example ammonium bisulfate, is used in combination with said acid (2) (especially sulfamic acid) a ratio (K) of the number of moles of sulfamic acid to the number of moles of ammonium bisulfate may be in the range 5:95 to 95:5, preferably 10:90 to 90:10, more preferably 20:80 to 80:20. In especially preferred embodiments, ratio (K) may be in the range 23:77 to 77:23.

Sulfamic acid has relatively low solubility. It could be provided as a slurry in an aqueous formulation used in the method. Advantageously, it can be used in combination with ammonium bisulfate as described to provide a solution of sulfamic acid.

A ratio (L) defined as the number of moles of said ammonium compound divided by the sum of the number of moles of ammonium bisulfate and said acid (2), (especially wherein acid (2) is sulfamic acid) contacted with the formation and/or reacted with said ammonium compound and oxidizing agent in the formation may be in the range greater than 0 and may be 10 or less. Ratio (L) may be in the range 0.1 to 5.0, preferably in the range 0.25 to 2.0 and, especially, 0.4 to 1.1.

A ratio (M) defined as the number of moles of said ammonium compound divided by the sum of the number of moles of ammonium bisulfate and said acid (2), (especially wherein acid (2) is sulfamic acid) which are arranged to react, for example with other materials contacted with the formation, to produce a gas (e.g. nitrogen) as described may be the range greater than 0 and may be 10 or less. Ratio (M) may be in the range in the range 0.1 to 5.0, preferably in the range 0.25 to 2.0 and, especially, 0.4 to 1.1.

In addition to the production of gas as described, said method may also produce heat to facilitate treatment of the formation.

Said method of treating said subterranean formation may be used in any subterranean formation that may benefit from the gas or heat rapidly generated by the reaction, for example to facilitate hydrocarbon production. The method may comprise treatment of said subterranean formation in a drilling operation, a stimulation operation, a hydraulic stimulation operation, a sand control operation, a completion operation, a scale inhibiting operation, a water-blocking operation, a clay stabilizer operation, a foam fracturing operation, a frac-packing operation, a gravel packing operation, a wellbore strengthening operation, a sag control operation, an acidising operation, an alkaline treatment operation, deposit removing operation, a 'Huff and Puff' operation, in a process for inhibiting 'frac hits', a wellbore damage removal operation, clean-up of a perforation, reduction of the hydrostatic pressure of the well, free stuck coiled tubing and/or pipe, a reservoir re-pressurisation operation, a depletion control operation, for far-field hydraulic fracture diversion, to reduce proppant settling, to reduce sand settling, an operation for increasing fracture complexity, or a fracturing operation.

Said method of treating a formation may be a 'Huff and Puff' operation.

'Huff and Puff' is a process that re-pressurises the near well area of the reservoir and reducing the viscosity of the oil in the surrounding formation. The reduction in oil viscosity can be achieved by pressurising the reservoir with a gas or fluid, comprising carbon dioxide which dissolves into the oil and reduces its viscosity. The pressurisation of the reservoir may be achieved by using any of the gas-generating reactions according to the invention. A typical 'Huff and Puff' operation would comprise a first step (i) of placing the gas generating chemicals within the wellbore and reacting them until the desired pressure is reached and a second 'shut-in' step (ii) wherein the well is sealed. Said shut-in step may be a full day or overnight. Once the well is opened production can resume.

Said method of treating a subterranean formation may be a process for inhibiting 'frac hits'.

A 'frac hit' occurs when wells have been drilled in close proximity and fractures formed in the more recently drilled well grow into and through the production area of the older well and in some cases cause damages to the older well. Fractures preferentially propagate through the weaknesses within the formation and so increasing the pressure in and about the old well can divert and/or deflect the new fractures away from the older wells. The pressurisation of the older well can be achieved by contacting the ammonium compound, oxidising agent, especially said nitrite, and sulfamic acid within the older wellbore. This may be carried out as a one off treatment or the ammonium compound, oxidising agent, especially said nitrite, and sulfamic acid may be continuously injected to maintain a desired pressure.

Said method may comprise treatment of said subterranean formation, for example to fracture the formation or increase the complexity of a fracture network and/or stimulate hydrocarbon, for example oil and/or gas, production. By stimulate hydrocarbon production we mean, providing a method that improves the flow of hydrocarbons from the formation into the production well. More preferably, said method comprises treatment of said subterranean formation to fracture the formation or increase the complexity of a fracture network to facilitate hydrocarbon, for example oil and/or gas, production. For example, said method may extend an existing fracture, create new fractures or create microfractures extending out from a hydraulic fracture.

Preferably, said method is used in: a stimulation operation, a hydraulic stimulation operation, a 'Huff and Puff' operation, in a process for inhibiting 'frac hits', a wellbore damage removal operation, clean-up of a perforation, reduction of the hydrostatic pressure of the well, freeing stuck coiled tubing and/or pipe, a re-pressurisation operation, a depletion control operation, for far-field hydraulic fracture diversion, to reduce proppant settling, to reduce sand settling, an operation for increasing fracture complexity, or a fracturing operation.

Said method of treating a formation may comprise a wellbore damage removal operation.

Said method of treating a formation may be to free stuck coiled tubing and/or pipe.

Said method of treating a formation may comprise cleaning equipment, for example drilling equipment such as coil tubing underground. Gas produced may be arranged to clean equipment by the gas pressure blowing off oil and/or other solid/liquid contaminants from the equipment.

Said method of treating a formation may comprise a reservoir re-pressurisation operation.

Said method of treating a formation may comprise far-field hydraulic fracture diversion.

Said method of treating a formation may comprise reducing proppant settling.

Said method of treating a formation may comprise a stimulation operation.

The subterranean formation may comprise a source rock comprising hydrocarbons (e.g., oil or natural gas) and may include shale, sandstone, limestone or mixtures thereof. Said subterranean formation may be subsea.

Said method of said first aspect is preferably a method of treating said formation to stimulate the formation, for example to facilitate production of hydrocarbons, for example oil or gas from the formation. The method may comprise treating the formation to create or enhance a fracture in the formation. The method preferably comprises treatment of a formation which has already been fractured, wherein the method is arranged to enhance an existing fracture network and/or stimulate further hydrocarbon production from an existing formation.

The method may include introducing proppant and/or microproppant into the formation to enter fractures formed in the method. Proppant and/or microproppant may be included in a formulation introduced to the formation after the formation has been treated with said ammonium bicarbonate, oxidizing agent and optional other reagents as described.

The method may also include introducing the proppant and/or microproppant in one or more of the formulations used in said method, so as to prop any fractures or microfractures formed as a result of the method.

Said method may comprise introducing said ammonium compound, for example in aqueous solution, into the formation. Said ammonium compound may be directed towards a region of said formation it is desired to treat, for example fracture and/or stimulate. Said method may involve introducing said ammonium compound via an injection well. Coil-tubing (or the like) may be used to direct the ammonium compound towards said region.

Said method may comprise introducing said oxidizing agent, for example in aqueous solution, into the formation. Said oxidizing agent may be directed towards a region of said formation it is desired to treat, for example fracture and/or stimulate. Said method may involve introducing said oxidizing agent via an injection well. Coil-tubing (or the like) may be used to direct the oxidizing agent towards said region.

Said method may comprise introducing said bisulfate salt, for example, ammonium bisulfate, for example in aqueous solution, into the formation. Said bisulfate salt, for example, ammonium bisulfate, may be directed towards a region of said formation it is desired to treat, for example fracture and/or stimulate. Said method may involve introducing said bisulfate salt, for example, ammonium bisulfate, via an injection well. Coil-tubing (or the like) may be used to direct the bisulfate salt, for example, ammonium bisulfate, towards said region.

Said method may comprise introducing a mixture (A) comprising bisulfate salt, for example, ammonium bisulfate and said acid (2) (especially sulfamic acid) as described into the formation. The mixture (A) may comprise an aqueous mixture which may comprise dissolved bisulfate salt, for example, ammonium bisulfate and dissolved or suspended acid (2) (especially dissolved or suspended sulfamic acid). Said mixture (A) may be directed towards a region of said formation it is desired to treat, for example fracture and/or stimulate. Said method may involve introducing said mixture (A) via an injection well. Coil-tubing (or the like) may be used to direct the mixture (A) towards said region.

In the method, said ammonium compound and said oxidizing agent are preferably not contacted with one another above ground. They are preferably contacted underground, preferably during passage towards or after arrival at the region of said formation it is desired to treat.

In the method, said bisulfate salt, for example, ammonium bisulfate, is preferably not contacted with said ammonium compound and oxidizing agent above ground. It is preferably contacted with said ammonium compound and/or oxidizing agent underground, preferably during passage towards or after arrival at the region of said formation it is desired to treat.

In the method, for example in fracturing of a formation by production of gas within the formation, the sum of the wt % of a formulation (F1) (e.g. an aqueous formulation) comprising said ammonium compound, a formulation (F2) (e.g. an aqueous formulation) comprising said oxidizing agent and a formulation (F3) (e.g. an aqueous formulation) comprising said ammonium bisulfate introduced into the formation is at least 80 wt %, preferably at least 90 wt %, more preferably at least 98 wt % of the total weight of materials introduced into the formation as part of the fracturing of the formation by production of gas within the formation, as described. It is preferred that the treatment to produce gas comprises use of only three formulations, e.g. (F1), (F2) and (F3). For the avoidance of doubt, in one embodiment, formulation (F3) may comprise mixture (A) or may comprise ammonium bisulfate in the absence of an acid (2) as described.

In another embodiment of the method, for example in fracturing of a formation by production of gas within the formation, the sum of the wt % of a formulation (F3) (e.g. an aqueous formulation) comprising said bisulfate salt, for example ammonium bisulfate, and a formulation (F4) (e.g. an aqueous formulation) comprising said ammonium compound, said oxidizing agent, preferable said nitrite and an alkali, introduced into the formation is at least 80 wt %, preferably at least 90 wt %, more preferably at least 98 wt % of the total weight of materials introduced into the formation as part of the method of treating of the formation by production of gas and/or heat within the formation, as described in the first aspect. For the avoidance of doubt, the aforementioned sum of the wt % is not intended to include a formulation (eg an inert spacer) which may be introduced into the formation (and may contact formulation (F3) and/or (F4)) but which does not include an active ingredient which is involved in production of gas in the formation as described herein.

The sum of the wt % of ammonium compound and water in formulation (F1) is suitably at least 80 wt %, preferably at least 90 wt %, more preferably at least 95 wt %.

The sum of the wt % of oxidizing agent and water in formulation (F2) is suitably at least 80 wt %, preferably at least 90 wt %, more preferably at least 95 wt %.

The sum of the wt % of said bisulfate salt, for example ammonium bisulfate and water in formulation (F3) is suitably at least 50 wt %, preferably at least 90 wt %, more preferably at least 95 wt %. In another embodiment, the sum of the wt % of said bisulfate salt, for example ammonium bisulfate, acid (2) and water in formulation (F3) is suitably at least 50 wt %, preferably at least 90 wt %, more preferably at least 95 wt %.

The sum of the wt % of ammonium compound, oxidising agent, preferably said nitrite, alkali and water in formulation (F4), when introduced into the formation, is suitably at least 80 wt %, preferably at least 90 wt %, more preferably at least 95 wt %.

In another embodiment of the method, for example in fracturing of a formation by production of gas within the formation, a formulation (F5) may be provided, wherein said formulation is aqueous and comprises said ammonium compound and said one or more acids. In the method, for example in fracturing of a formation by production of gas within the formation, the sum of the wt % of formulation (F5) and a formulation (F2) (e.g. an aqueous formulation) comprising said oxidizing agent, preferably said nitrite, is at least 80 wt %, preferably at least 90 wt %, more preferably at least 98 wt % of the total weight of materials introduced into the formation as part of the fracturing of the formation by production of gas within the formation, as described. For the avoidance of doubt, the aforementioned sum of the wt % is not intended to include a formulation (eg an inert spacer) which may be introduced into the formation (and may contact formulation (F5) and/or (F2)) but which does not include an active ingredient which is involved in production of gas in the formation as described herein.

Any of formulations (F1), (F2), (F3), (F4) and (F5) may comprise additional components commonly used in the treatment of subterranean formations for example: acids, biocides, breakers, co-solvents, corrosion inhibitors, cross-linking agents, fluid loss control additives, friction reducers, iron control agents, oxygen scavengers, pH adjusting agents, proppants, microproppants, salts, scale inhibitors, surfactants, sulfide scavengers, viscosifying agents, clay stabilisers and the like.

Co-solvents may be used in any of formulations (F1), (F2), (F3), (F4) and (F5) to improve the solubility of the reagents in water and/or the thermodynamic stability of the solution. The co-solvents are preferably polar solvents for example: alcohols, glycols, amides, esters, ketones, sulfoxides etc. Suitably, the co-solvents are methanol or formamide or mixtures thereof. Specific examples may be selected from methanol and/or formamide.

Any suitable method may be used to place reagents into a well and/or deliver to a desired position in a formation. The well may be a horizontal or vertical well. However, preferred methods keep selected reagents isolated from each other until they reach the desired location within the formation.

Coiled tubing may be used to place reagents downhole. In this case, the end of the tube is placed where gas generation is required. One solution is pumped through the tubing and another solution along the casing. For example, Formulation (F3) may be pumped through the coil and formulation (F4) may be pumped along the casing.

Coiled tubing may be especially useful to place the reagents downhole in: a fracturing operation, a perforation clean-up operation, a wellbore damage removal operation, an operation to reduce the hydrostatic pressure of a well, or to free stuck coiled tubing and/or pipe.

Spacers may be used to keep the reagents and/or compositions separate until they reach a desired position in the formation. In this technique, a fluid, preferably an inert fluid, would used to separate the two formulations of reactive components. Typically with this technique, 5-10 bbl of the inert fluid may be used. Examples of inert fluids suitable for this technique include, but are not limited to, pure water and oil.

In one embodiment, the formulations (F1), (F2) and (F3) are introduced, in any order, with an inert spacer separating each of the formulations. Formulation (F3) may be used as a spacer to separate formulations (F1) and (F2), In another embodiment, formulations (F3) and (F4) may be introduced into the formations with an inert spacer separating the two formulations.

Spacers may be used to place the formulations downhole in the following operations: reservoir re-operation, a depletion control operation, a damage removal operation, for far-field hydraulic fracture diversion, a fracturing operation, to reduce sand or proppant settling.

The formulations may be provided as part of an emulsion, for example water-in-oil emulsions or double emulsions, for example water-in-oil-in-water. In a double emulsion, the inner water phase may be a formulation e.g. (F3) and the outer water phase may be the a different formulation e.g. (F4).

In preferred embodiments described herein, the number of moles of gas generated per mole of reactants may be increased compared to prior art proposals.

The sum of the total weight in grams (g) of ammonium compound, oxidizing agent, preferably said nitrite, and acid(s) (e.g. including or consisting of ammonium bisulfate) introduced into the formation is herein referred to as SUM-W. The sum of the total volume of gas (e.g. $CO_2$ and/or $N_2$) in $cm^3$ generated by reaction of ammonium compound, oxidizing agent, preferably said nitrite, and said acid(s) is herein referred to as SUM-V. Preferably, in the method, the Reaction Efficiency is defined as the volume of gases produced divided by the weight of reactants (ie SUM-V divided by SUM-W). The Reaction Efficiency is suitably at least 100 $cm^3/g$, for example at least 160 $cm^3/g$, or at least 180 $cm^3/g$, or at least 190 $cm^3/g$. It may be less than 300 $cm^3/g$.

The Reaction Efficiency as described may suitably be calculated based on weights of the specified reagents selected and gas generated by reaction thereof in a reaction carried out under controlled conditions at the surface, based on amounts of reagents which are to be introduced into the formation, since measurements within the formation itself are not practical. Values referred to are suitably measured at STP, unless otherwise stated.

To minimise the quantity of one or more of the formulations leaking off into the formation and to maximise the fracturing effect, it is desirable that the gas is rapidly generated after the components have been contacted with each other. The gas generation may substantially be complete within 10 minutes of all the components being contacted with each other. Preferably, the gas generation is substantially complete within 5 minutes of the components being contacted with each other.

The quantities of formulations introduced into the formation as part of the method may be suitably selected dependent on the features of the formation, for example the confining pressure, and the pressure required to achieve the desired effect of said method of treating said formation. Thus, it is anticipated that any quantity of the formulations may be used. However, preferably at least 1 bbl may be used, for example 10 to 500 bbl, or from 100 to 350 bbl, preferably from 150 to 250 bbl.

The rate at which one of more of the fluids is injected may suitably be adjusted according to the method of treating the formation and the method of delivering the components. For example, it may be injected at a rate sufficient to build up a pressure such as that it fractures the formation In some methods of treating a subterranean formation, it may be preferable to generate pulses of higher and lower pressures within the formation. This effect may be achieved by repeatedly reacting a gas producing formulation within the formation. Either mechanical, chemical or combinations of mechanical and chemical methods may be used to control the manner in which the formulations are contacted with the formation to produce a series of pressure pulses. Said pulses of pressure may be created in treating a subterranean formation in a method comprising:

(i) introducing a first gas producing formulation into the formation so the formulation produces a gas in the formation;
(ii) reducing the rate of gas production within the formation, so the pressure produced in this step is lower than in step (i) and may be 0;
(iii) introducing a second gas producing formulation into the formation, which formulation may be the same or different to the first gas producing formulation, thereby to produce a pressure higher than in step (ii); and, optionally,
(iv) reducing the rate of introduction of said second gas producing formulation into the formation.

Steps (ii) and (iii) may be suitably repeated to produce further pressure pulses as required.

Steps (i) through to (iv) may be carried out continuously, intermittently or a mixture of continuously and intermittently.

In step (ii), the reduction of rate of gas production in the formation may be achieved mechanically, for example by reducing or stopping the amount of one or more gas generating reagents being introduced into the formation.

Step (ii) may be achieved using chemical means. For example, in one embodiment, step (ii) may be achieved by pumping an inert fluid e.g. a spacer in between the pumping of gas producing formulations. In another embodiment, step (ii) may be achieved by pumping an inert fluid concurrently with the first gas producing formulation, so as to reduce the concentration of the gas producing formulation and the rate at which the gas is produced. Then, step (iii) may comprise stopping the pumping of the inert fluid.

In some embodiments the gas generating reagents used in the gas producing formulation used in step (i) may be non-stoichiometric. In this case step (ii) may occur when one of the reagents (herein reagent (P)) is consumed so gas generation stops, leaving an excess of the remaining reagents (herein reagents (Q)). Step (iii) may then comprise injecting a formulation comprising an excess of reagent (P). Steps (i) to (iii) may be repeated with the injected formulations being alternated. For example the method may comprise contacting the formation with 20 bbl of a solution of ammonium compound and acid and 10 bbl of a solution of sodium nitrite in step (i). Step (ii) occurs when the 10 bbl of sodium nitrite is consumed. Step (iii) may comprise injecting 10 bbl or more of sodium nitrite to produce a second pressure pulse. If the method is to be repeated, step (iii) may use a large excess of sodium nitrite.

According to a second aspect of the invention, there is provided a mixture for treating a subterranean formation, the mixture comprising:

(a) an ammonium compound;
(b) an oxidizing agent selected from a perchlorate or a nitrite or combinations thereof; and
(c) one or more acids, at least one of which is a bisulfate salt, for example ammonium bisulfate.

The mixture is preferably produced below ground, for example within a subterranean formation.

The ammonium compound, oxidizing agent and a bisulfate salt, for example ammonium bisulfate, may be as described in the first aspect.

According to a third aspect of the invention, there is provided a collocation adjacent a subterranean formation and/or adjacent an injection well of a subterranean formation, wherein said collocation comprises (P), (Q) or (R) as described below:

(P) a formulation comprising an ammonium compound (e.g. formulation (F1) of the first aspect), which is preferably provided in a receptacle (e.g. a receptacle (A));
a formulation comprising an oxidizing agent (e.g. formulation (F2) of the first aspect), which is preferably provided in a receptacle (e.g. a receptacle (B)); and, optionally (but preferably)
a formulation comprising one or more acids (e.g. formulation (F3) of the first aspect), which is preferably provided in a receptacle (e.g. a receptacle (C));
(Q) a formulation comprising an ammonium compound and an oxidising agent, preferably a nitrite which is preferably provided in a receptacle; and, optionally (but preferably)
a formulation comprising one or more acids which is preferably provided in a receptacle;
(R) a formulation (F5), wherein said formulation is aqueous and comprises an ammonium compound and one or more acids, wherein said formulation is preferably provided in a receptacle; and
a formulation (F2) (e.g. an aqueous formulation) comprising oxidizing agent, preferably a nitrite which is preferably provided in a receptacle.

The collocation suitably includes pipework for delivering the formulations into the subterranean formation. Receptacle (A) may communicate with a pipe (which may comprise coil tubing) arranged to deliver formulation (F1) into the formation. Receptacle (B) may communicate with a pipe (which may comprise coil tubing) arranged to deliver formulation (F2) into the formation. Receptacle (C) may communicate with a pipe (which may comprise coil tubing) arranged to deliver formulation (F3) into the formation.

In another embodiment, receptacle (D) may communicate with a pipe (which may comprise coil tubing) arranged to deliver formulation (F4) into the formation; and in the same treatment, receptacle (C) may communicate with a pipe (which may comprise coil tubing) arranged to deliver formulation (F3) into the formation.

According to a fourth aspect, there is provided the use of the following for gas generation in a subterranean formation:

(a) an ammonium compound;
(b) an oxidizing agent selected from a perchlorate or a nitrite or combinations thereof;
(c) one or more acids, at least one of which is a bisulfate salt, for example ammonium bisulfate.

The number of moles of gas generated per mole of reactants may be increased compared to prior art proposals.

The use may be as described in the first aspect.

Any feature of any aspect of any invention or embodiment described herein may be combined with any aspect of any other invention or embodiment described herein mutatis mutandis.

BRIEF DESCRIPTION OF THE DRAWINGS

Specific embodiments of the invention will now be described, by way of example, with reference to.

WORKING EXAMPLES

A subterranean formation may be treated with reagents which are arranged to react to produce a gas and/or heat within the formation. This may stimulate the formation by improving a fracture network within the formation, for example by creating new fractures, extending existing fractures, opening up naturally-occurring fractures or creating microfractures. The examples which follow describe reagents which may be used in a treatment.

Example 1—General Procedure for Undertaking Reactions

An ammonium compound and a nitrite or perchlorate-containing compound were added to a round-bottom flask and dissolved in the minimum quantity of water. Suitable apparatus to measure gas released was arranged in position and the solution heated with stirring to 75° C. Once the solution had reached 75° C., 20 mmol of an acid was also heated to 75° C. and was injected into the reaction vessel. The quantity of gas generated was recorded.

In Examples 2 and 3, reactions were undertaken using different acids.

Example 2 (Comparative)—Using Hydrochloric Acid

Ammonium bicarbonate (10 mmol) and sodium nitrite (25 mmol), were added to a round-bottom flask and dissolved in the minimum quantity of water (10.5 mL). Suitable apparatus to measure gas released was arranged in position and the solution heated with stirring to 75° C. Once the solution had reached 75° C., 1.67 mL of a 12 M aqueous solution of hydrochloric acid (20 mmol) heated to 75° C. was injected into the reaction vessel. The quantity of gas generated was recorded.

Example 3—Using Ammonium Bisulfate

Example 2 was repeated using 2.4 mL of an 8.33M aqueous solution of ammonium bisulfate (20 mmol) as the acid.

Figure 1:
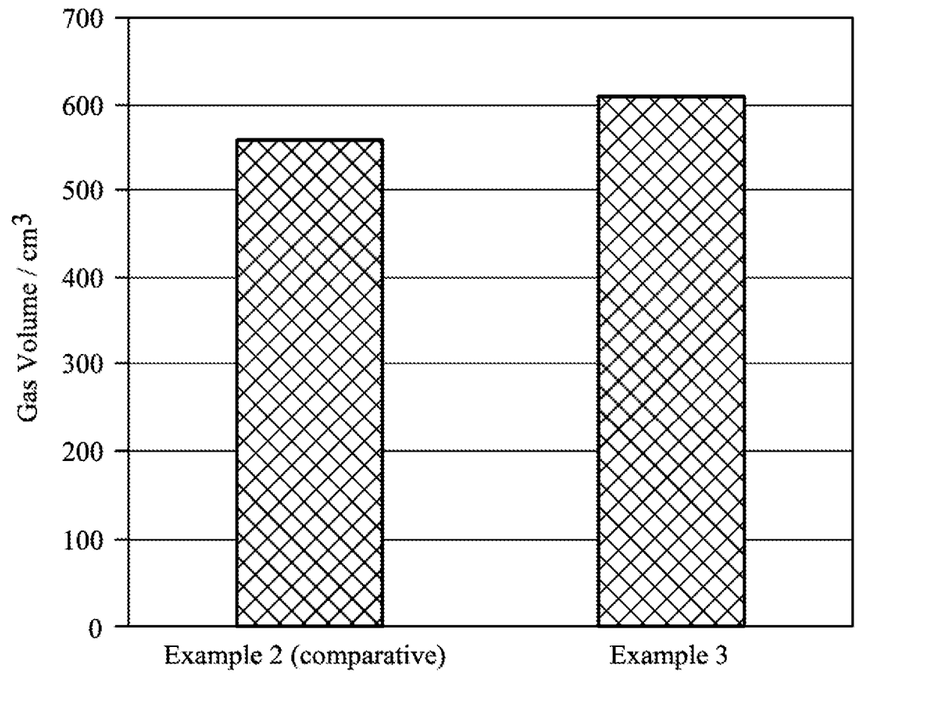
FIG. 1, which is a graph showing gas volume generated for Examples 2 and 3.

The results for the gas volumes generated are provided in FIGURE from which it will be noted that the volume of gas using ammonium bisulfate as the only acid is significantly greater (610 cm$^3$) than when using hydrochloric acid (Example 2) (560 cm$^3$).

In Examples 5 to 16, the gas generated by use, as acids, of a combination of ammonium bisulfate and sulfamic acid was compared to use of hydrochloric acid.

Example 4 (Comparative)

2.9 mL of an aqueous solution of ammonium sulfamate (5 mmol) and sodium nitrite (20 mmol) was added to a round-bottom flask. Suitable apparatus to measure gas release was arranged in position and the solution heated to 75° C. Once the solution reached 75° C., 0.83 mL of a 12 M aqueous solution of hydrochloric acid (10 mmol), heated to the same temperature, was injected into the reaction vessel. The quantity of gas generated was recorded.

Example 5

2.9 mL of an aqueous solution of ammonium sulfamate (5 mmol) and sodium nitrite (20 mmol) was added to a round-bottom flask. Suitable apparatus to measure gas release was arranged in position and the solution heated to 75° C. Once the solution reached 75° C., 4.0 mL of an aqueous solution containing sulfamic acid (7.5 mmol) and ammonium bisulfate (2.5 mmol), heated to the same temperature, was injected into the reaction vessel. The quantity of gas generated was recorded.

Example 6

2.9 mL of an aqueous solution of ammonium sulfamate (5 mmol) and sodium nitrite (20 mmol) was added to a round-bottom flask. Suitable apparatus to measure gas release was arranged in position and the solution heated to 75° C. Once the solution reached 75° C., 3.0 mL of an aqueous solution containing sulfamic acid (5 mmol) and ammonium bisulfate (5 mmol), heated to the same temperature, was injected into the reaction vessel. The quantity of gas generated was recorded.

Example 7

2.9 mL of an aqueous solution of ammonium sulfamate (5 mmol) and sodium nitrite (20 mmol) was added to a round-bottom flask. Suitable apparatus to measure gas release was arranged in position and the solution heated to 75° C. Once the solution reached 75° C., 1.95 mL of an aqueous solution containing sulfamic acid (2.5 mmol) and ammonium bisulfate (7.5 mmol), heated to the same temperature, was injected into the reaction vessel. The quantity of gas generated was recorded.

Example 8

2.2 mL of an aqueous solution containing ammonium sulfamate (7 mmol), sulfamic acid (1 mmol) and ammonium bisulfate (9 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 9

2.5 mL of an aqueous solution containing ammonium sulfamate (5 mmol), sulfamic acid (2.5 mmol) and ammonium bisulfate (7.5 mmol) were added to a round-bottom flask. Suitable apparatus to measure gas release was arranged in position and the solution heated to 75° C. Once the solution reached 75° C., 2.5 mL of an aqueous solution containing sodium nitrite (20 mmol), heated to the same temperature, was injected into the reaction vessel. The quantity of gas generated was recorded.

Example 10

2.2 mL of an aqueous solution containing ammonium sulfamate (6.25 mmol), sulfamic acid (1.5 mmol) and ammonium bisulfate (8.5 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 11

2.2 mL of an aqueous solution containing ammonium sulfamate (6.25 mmol), sulfamic acid (1.75 mmol) and ammonium bisulfate (7 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 12

2.2 mL of an aqueous solution containing ammonium sulfamate (5.5 mmol), sulfamic acid (2.63 mmol) and ammonium bisulfate (4.88 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 13

2.2 mL of an aqueous solution containing ammonium sulfamate (6 mmol), sulfamic acid (2.24 mmol) and ammonium bisulfate (4.76 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 14

2.2 mL of an aqueous solution containing ammonium sulfamate (6.25 mmol), sulfamic acid (2.50 mmol) and ammonium bisulfate (4.25 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Example 15

2.2 mL of an aqueous solution containing ammonium sulfamate (6.25 mmol), sulfamic acid (2.50 mmol) and ammonium bisulfate (3.75 mmol) were added to a round-bottom flask. Suitable apparatus to measure gas release was arranged in position and the solution heated to 75° C. Once the solution reached 75° C., 2.2 mL of an aqueous solution containing sodium nitrite (20 mmol), heated to the same temperature, was injected into the reaction vessel. The quantity of gas generated was recorded.

Results for Examples 4 to 15 are provided in the table below, from which it will be noted that the combination of sulfamic acid and ammonium bisulfate is a more efficient gas generator compared to use of hydrochloric acid.

Example 16—Comparison of Use of Acid Combination Sulfamic Acid/Ammonium Bisulfate with Hydrochloric Acid Alone and Sulfamic Acid Alone Ammonium bisulfate increases the solubility of sulfamic acid in water and, it has been found, can be used to increase the amount of gas generated by a certain volume of the composition.

Comparative Example 17 was carried out in the same manner as Example 4, except 10 mmol of sulfamic acid was used instead of 10 mmol HCl.

| Example No. | Acid | Total solution volume/ $cm^3$ | gas generated by 1 cm3 of solution/ cm3 |
|---|---|---|---|
| 4 (comparative) | Hydrochloric | 5.5 | 84 |
| 17 (comparative) | Sulfamic | 7.5 | 100 |
| 5 | Sulfamic/ammonium bisulfate (75:25) | 6.8 | 109 |
| 6 | Sulfamic/ammonium bisulfate (50:50) | 6.1 | 115 |
| 7 | Sulfamic/ammonium bisulfate (25:75) | 5.1 | 129 |
| 8 | Sulfamic/ammonium bisulfate (10:90) | 4.4 | 143 |
| 9 | Sulfamic/ammonium bisulfate (25:75) | 5.0 | 132 |
| 10 | Sulfamic/ammonium bisulfate (15:85) | 4.4 | 145 |
| 11 | Sulfamic/ammonium bisulfate (20:80) | 4.4 | 150 |
| 12 | Sulfamic/ammonium bisulfate (35:65) | 4.4 | 150 |
| 13 | Sulfamic/ammonium bisulfate (32:68) | 4.4 | 151 |
| 14 | Sulfamic/ammonium bisulfate (37:63) | 4.4 | 152 |
| 15 | Sulfamic/ammonium bisulfate (40:60) | 4.4 | 148 |

Thus, it should be appreciated from the above that ammonium bisulfate may advantageously be used as the only acid in the reaction or may advantageously be used with sulfamic acid to improve gas generation.

The reagents described herein may be used in treatment of a formation as described. Reagents may be delivered in receptacles to a well-head for subsequent injection, for example using coiled tubing as described herein, into the formation. Exemplary compositions including concentrations and amounts in pound (lb) are detailed in the table below. Pounds (lb) can be converted to kg by multiplication by 0.45.

| Example | mmol $NH_4NH_2SO_3$ | mmol $NaNO_2$ | Acid | mmol acid | Gas generated/$cm^3$ | Total mass/g | Efficiency/ $cm^3$ per g |
|---|---|---|---|---|---|---|---|
| 4 (comparative) | 5 | 20 | Hydrochloric | 10.0 | 460 | 2.95 | 156 |
| 5 | 5 | 20 | Sulfamic/ammonium bisulfate (75:25) | 10.0 | 740 | 2.97 | 249 |
| 6 | 5 | 20 | Sulfamic/ammonium bisulfate (50:50) | 10.0 | 700 | 3.01 | 232 |
| 7 | 5 | 20 | Sulfamic/ammonium bisulfate (25:75) | 10.0 | 660 | 3.06 | 216 |
| 8 | 7 | 20 | Sulfamic/ammonium bisulfate (10:90) | 10.0 | 630 | 3.31 | 190 |
| 9 | 5 | 20 | Sulfamic/ammonium bisulfate (25:75) | 10.0 | 660 | 3.06 | 216 |
| 10 | 6.25 | 20 | Sulfamic/ammonium bisulfate (15:85) | 10.0 | 640 | 3.22 | 199 |
| 11 | 6.25 | 20 | Sulfamic/ammonium bisulfate (20:80) | 8.8 | 660 | 3.07 | 215 |
| 12 | 5.5 | 20 | Sulfamic/ammonium bisulfate (35:65) | 7.5 | 660 | 2.82 | 234 |
| 13 | 6 | 20 | Sulfamic/ammonium bisulfate (32:68) | 7.0 | 665 | 2.83 | 235 |
| 14 | 6.25 | 20 | Sulfamic/ammonium bisulfate (37:63) | 6.8 | 670 | 2.83 | 237 |
| 15 | 6.25 | 20 | Sulfamic/ammonium bisulfate (40:60) | 6.3 | 650 | 2.77 | 235 |

| Example No. | Acid | Acid conc/M | Mass of acid solution/lb | Amount of NH$_4$HCO$_3$ solution/lb* | Amount of NaNO$_2$ solution/lb** |
|---|---|---|---|---|---|
| 18 | Ammonium bisulfate | 8.33 | 10828 | 3720 | 9739 |
| 19 | Sulfamic + ammonium bisulfate (75:25) | 1.88 / 0.63 | 4994 / 1984 | 2704 | 7079 |
| 20 | Sulfamic + ammonium bisulfate (50:50) | 1.67 / 1.67 | 3687 / 4371 | 2996 | 7844 |
| 21 | Sulfamic + ammonium bisulfate (25:75) | 1.28 / 3.85 | 2072 / 7388 | 3379 | 8848 |
| 22 | Sulfamic ammonium bisulfate (10:90) | 0.71 / 6.43 | 885 / 9496 | 3622 | 9484 |

*The Ammonium Bicarbonate was made up to a 0.8M aqueous solution

** The Sodium Nitrite was made up to a 2.40M aqueous solution.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of treating a subterranean formation, the method comprising contacting the formation with:
   (a) an ammonium compound;
   (b) an oxidizing agent selected from a perchlorate or a nitrite or combinations thereof; and
   (c) one or more acids, at least one of which is a bisulfate salt,
   wherein said bisulfate salt is treated in the method to produce gas which supplements gas produced by reaction of said ammonium compound and said oxidizing agent, and
   wherein, in the method, said ammonium compound and said oxidizing agent are contacted underground during passage towards or after arrival at a region of said subterranean formation it is desired to treat, wherein the gas produced includes nitrogen atoms originating in the bisulfate salt.

2. The method according to claim 1, wherein the method comprises treating the formation to create or enhance a fracture in the formation.

3. The method according to claim 1, wherein said oxidizing agent comprises a nitrite which, optionally, is sodium nitrite.

4. The method according to claim 1, wherein said ammonium compound and said oxidizing agent are contacted so they react and nitrogen and carbon dioxide are generated in the formation.

5. The method according to claim 1, wherein said oxidizing agent is a nitrite and wherein a ratio (A) defined as the number of moles of ammonium compound divided by the number of moles of nitrite contacted with the formation and/or reacted in the formation is in the range 0.05 to 2.0.

6. The method according to claim 1, wherein said ammonium compound is selected from ammonium fluoride, ammonium chloride, ammonium bromide, ammonium iodide, ammonium nitrate, ammonium sulfate, ammonium hydrogensulfate, ammonium carbonate, ammonium carbamate, ammonium bicarbonate, ammonium hydroxide, ammonium acetate, ammonium borates, ammonium chromate, ammonium dichromate, ammonium cyanides, ammonium glutamate, ammonium molybdate, ammonium oxalate, ammonium hydrogenoxalate, ammonium phosphate monobasic, ammonium phosphate dibasic, ammonium thiosulfate, ammonium formate, ammonium sulfamate, ammonium sulfite, ammonium persulfate, ammonium sulfide, ammonium tartrate dibasic, ammonium thiocyanate, ammonium dihydrogen phosphate and ammonium glycinate.

7. The method according to claim 1, wherein said ammonium compound includes, in addition to NH$_4^+$ moiety, a second moiety which generates a gas on reaction with said oxidizing agent and/or said bisulfate salt.

8. The method according to claim 7, wherein said second moiety comprises a sulfamate, carbonate or bicarbonate moiety.

9. The method according to claim 1, wherein a ratio (B) defined as the number of moles of ammonium compound divided by the total number of moles of acid contacted with the formation and/or reacted with the ammonium compound and oxidizing agent in the formation is greater than 0 and is 10 or less; and/or wherein a ratio (C) defined as the number of moles of ammonium compound divided by the sum of the number of moles of one or more acids which are arranged to react with other materials contacted with the formation to produce a gas is greater than 0 and is 10 or less; and/or wherein a ratio (H) defined as the number of moles of oxidizing agent divided by the total number of moles of acid contacted with the formation is in the range 0.1-10.

10. The method according to claim 1, wherein said ammonium compound is provided in water and the method comprises selecting an aqueous solution, slurry or emulsion of said ammonium compound; and wherein said oxidizing agent is provided in water and the method comprises selecting an aqueous solution, slurry or emulsion of said oxidizing agent.

11. The method according to claim 1, wherein:
   the sum of the total weight in grams (g) of ammonium compound, oxidizing agent and acid(s) introduced into the formation is herein referred to as SUM-W;
   the sum of the total volume in cm$^3$ of gas generated by reaction of ammonium compound, oxidizing agent and said acid(s) is herein referred to as SUM-V;
   wherein, in the method, the Reaction Efficiency is defined as SUM-V divided by SUM-W;
   wherein the Reaction Efficiency is at least 100 cm$^3$/g and is less than 300 cm$^3$/g.

12. The method according to claim 1, wherein the method uses formulations comprising said ammonium compound, said oxidizing agent and/or said one or more acids and wherein said formulations include one or more co-solvents selected from methanol or formamide.

13. The method according to claim 1, wherein the method comprises producing pulses of pressure within the formation by controlling contact and/or amounts of said ammonium compound, said oxidizing agent and/or said acid within the formation.

14. The method according to claim 1, wherein said method includes introducing proppant and/or microproppant in one or more of formulations used in said method, so as to prop any fractures or microfractures formed as a result of the method.

15. A method of treating a subterranean formation, the method comprising contacting the formation with:
(a) an ammonium compound;
(b) an oxidizing agent selected from a perchlorate or a nitrite or combinations thereof; and
(c) one or more acids, at least one of which is a bisulfate salt,
wherein said bisulfate salt is treated in the method to produce gas which supplements gas produced by reaction of said ammonium compound and said oxidizing agent, and
wherein, in the method, said ammonium compound and said oxidizing agent are contacted underground during passage towards or after arrival at a region of said subterranean formation it is desired to treat, wherein said bisulfate salt is ammonium bisulfate.

16. A method of treating a subterranean formation, the method comprising contacting the formation with:
(a) an ammonium compound;
(b) an oxidizing agent selected from a perchlorate or a nitrite or combinations thereof; and
(c) one or more acids, at least one of which is a bisulfate salt,
wherein said bisulfate salt is treated in the method to produce gas which supplements gas produced by reaction of said ammonium compound and said oxidizing agent, and
wherein, in the method, said ammonium compound and said oxidizing agent are contacted underground during passage towards or after arrival at a region of said subterranean formation it is desired to treat, wherein said bisulfate salt is used in combination with an acid (2) which is sulfamic acid.

17. A method of treating a subterranean formation, the method comprising contacting the formation with:
(a) an ammonium compound;
(b) an oxidizing agent selected from a perchlorate or a nitrite or combinations thereof; and
(c) one or more acids, at least one of which is a bisulfate salt,
wherein said bisulfate salt is treated in the method to produce gas which supplements gas produced by reaction of said ammonium compound and said oxidizing agent, and
wherein, in the method, said ammonium compound and said oxidizing agent are contacted underground during passage towards or after arrival at a region of said subterranean formation it is desired to treat,
wherein the method comprises treating the formation to create or enhance a fracture in the formation by production of gas within the formation, wherein in the method the sum of the wt % of a formulation (F1) comprising said ammonium compound, a formulation (F2) comprising said oxidizing agent and a formulation (F3) comprising said bisulfate salt introduced into the formation is at least 98 wt % of the total weight of materials introduced into the formation as part of the fracturing of the formation, wherein said bisulfate salt is ammonium bisulfate.

18. A method of treating a subterranean formation, the method comprising contacting the formation with:
(a) an ammonium compound;
(b) an oxidizing agent selected from a perchlorate or a nitrite or combinations thereof; and
(c) one or more acids, at least one of which is a bisulfate salt,
wherein said bisulfate salt is treated in the method to produce gas which supplements gas produced by reaction of said ammonium compound and said oxidizing agent, and
wherein, in the method, said ammonium compound and said oxidizing agent are contacted underground during passage towards or after arrival at a region of said subterranean formation it is desired to treat,
wherein said an ammonium compound is ammonium sulfamate, said oxidizing agent is a nitrite and wherein said ammonium sulfamate and said nitrite are contacted underground during passage towards or after arrival at the region of said subterranean formation it is desired to treat.

19. The method according to claim 18, wherein:
said bisulfate salt is used in combination with an acid (2) which is sulfamic acid;
the method comprises treating the formation to create or enhance a fracture in the formation by production of gas within the formation; and
the sum of the total weight in grams (g) of ammonium compound, oxidizing agent and acid(s) introduced into the formation is herein referred to as SUM-W;
the sum of the total volume in $cm^3$ of gas generated by reaction of ammonium compound, oxidizing agent and said acid(s) is herein referred to as SUM-V;
wherein, in the method, the Reaction Efficiency is defined as SUM-V divided by SUM-W;
wherein the Reaction Efficiency is at least 100 $cm^3/g$ and is less than 300 $cm^3/g$.

* * * * *